United States Patent
Tsuji

(10) Patent No.: US 9,319,552 B2
(45) Date of Patent: Apr. 19, 2016

(54) IMAGE FORMING APPARATUS AND METHOD OF SETTING UPDATING INFORMATION BOTH OF WHICH BEING FOR EXECUTING FIRMWARE UPDATING WITH EXTERNAL EQUIPMENT CONNECTED

(71) Applicant: KYOCERA Document Solutions Inc., Osaka (JP)

(72) Inventor: Shuntaro Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/695,891

(22) Filed: Apr. 24, 2015

(65) Prior Publication Data

US 2015/0312433 A1    Oct. 29, 2015

(30) Foreign Application Priority Data

Apr. 24, 2014  (JP) ................. 2014-090154

(51) Int. Cl.
*G06F 3/12* (2006.01)
*H04N 1/00* (2006.01)
*G06K 15/00* (2006.01)

(52) U.S. Cl.
CPC ............ *H04N 1/00938* (2013.01); *G06F 3/123* (2013.01); *G06F 3/1203* (2013.01); *G06F 3/1225* (2013.01); *G06F 3/1226* (2013.01); *G06F 3/1236* (2013.01); *H04N 1/00344* (2013.01); *H04N 1/00965* (2013.01); *H04N 2201/0087* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2008/0270685 A1* | 10/2008 | Kato ................. | G06F 8/65 711/112 |
| 2012/0084767 A1* | 4/2012 | Ishimoto ............ | G06F 8/65 717/173 |
| 2014/0047430 A1* | 2/2014 | Kanematsu ......... | G06F 8/65 717/170 |
| 2014/0115572 A1* | 4/2014 | Michishita ......... | G06F 8/65 717/168 |

FOREIGN PATENT DOCUMENTS

JP    2004-148612 A    5/2004

* cited by examiner

*Primary Examiner* — Dov Popovici
(74) *Attorney, Agent, or Firm* — Hawaii Patent Services; Nathaniel K. Fedde; Kenton N. Fedde

(57) ABSTRACT

To provide a technique that makes it possible, for a user without conscious of the detailed firmware program contents and the current state of a device, to execute an update process in a case of using file in which plural firmware programs are packaged. Upon connection of an external auxiliary storage device that stores the package file, a detection of a firmware program to be updated turns a staring mode into an update mode for updating a firmware program. If a failure in an internal auxiliary storage device is detected after re-starting, a starting is made by the update mode using a firmware program in the package file. In a case where a firmware program that is to be installed into the flash memory is updatable, only the firmware program that is to be installed into the flash memory is installed and updated.

4 Claims, 3 Drawing Sheets

IMAGE FORMING APPARATUS AND METHOD OF SETTING UPDATING INFORMATION BOTH OF WHICH BEING FOR EXECUTING FIRMWARE UPDATING WITH EXTERNAL EQUIPMENT CONNECTED

INCORPORATION BY REFERENCE

This application is based on and claims the benefit of priority from Japanese Patent Application No. 2014-090154 filed on Apr. 24, 2014, the contents of which are hereby incorporated by reference.

BACKGROUND

The present disclosure relates to a method of updating setting and an image forming apparatus, and in particular to a method of updating setting and an image forming apparatus in a case of loading plural kinds of firmware programs.

In general, a firmware program is loaded in an image forming apparatuses, such as a printer and a multifunction peripheral. Sometimes, such a firmware program is stored in a mask ROM (Read Only Memory). In recent years, the firmware program is stored in a NAND type flash memory (nonvolatile memory) or in an HDD (Hard Disk Drive). In this case, no operations are required for exchanging the mask ROM that is mounted on the substrate. Therefore, the burden of a service person is reduced in the updating operation.

On the other hand, the function of an image forming apparatus and the like are being in enhancement. Therefore, there is a tendency to increase the frequency of updating the control program. In light of such circumstances, technologies have been proposed to improve the working efficiency and the precision in updating the firmware program. For example, one of such technologies is the urgent firmware updating via networks.

SUMMARY

An image forming apparatus of the present disclosure includes a flash memory, an internal auxiliary storage region that is different from the flash memory, and an updating control part. The flash memory stores a firmware program in an updatable manner. The updating control part turns a start mode into an update mode for use in a firmware program updating upon detection of a firmware program to be updated after being connected with an external auxiliary storage device that stores a package file in which a plurality of firmware programs are packaged. In addition, the updating control part starts the image forming apparatus by the update mode using the firmware program in the package file when the internal auxiliary storage region is in failure after a re-start. Further, the updating control part installs and updates, in a case where a firmware program that is to be installed into the flash memory is updatable even if an installation of a firmware program that is to be installed into the internal auxiliary storage region is unsuccessful, only the firmware program that is to be installed into the flash memory.

A method of updating setting according to the present disclosure is a method of updating setting of an information processing apparatus in which a firmware program is stored in a flash memory and an internal auxiliary storage region that is different from the flash memory. The flash memory and the internal auxiliary storage region store the firmware program in an updatable manner. The present method detects a firmware program to be updated when the information processing apparatus is connected with an external auxiliary storage device that stores a package file in which a plurality of firmware programs are recorded in a packaged manner. In addition, the present method determines whether or not an internal auxiliary storage device is in failure after a re-starting, the re-starting being made after turning a start mode to indicate an update mode for use in a firmware program updating when the firmware program that is to be updated is detected. Further, the present method starts the information processing apparatus by the update mode using the firmware program in the package file when an occurrence of the failure is found; Moreover, the present method installs and updates, in a case where a firmware program that is to be installed into the flash memory is updatable even if an installation of a firmware program that is to be installed into the inner auxiliary storage region is unsuccessful, only the firmware program that is to be installed into the flash memory.

DETAILED DESCRIPTION

Hereinafter, embodiments of the present disclosure will be described with reference to the attached drawings.

Figure 1:
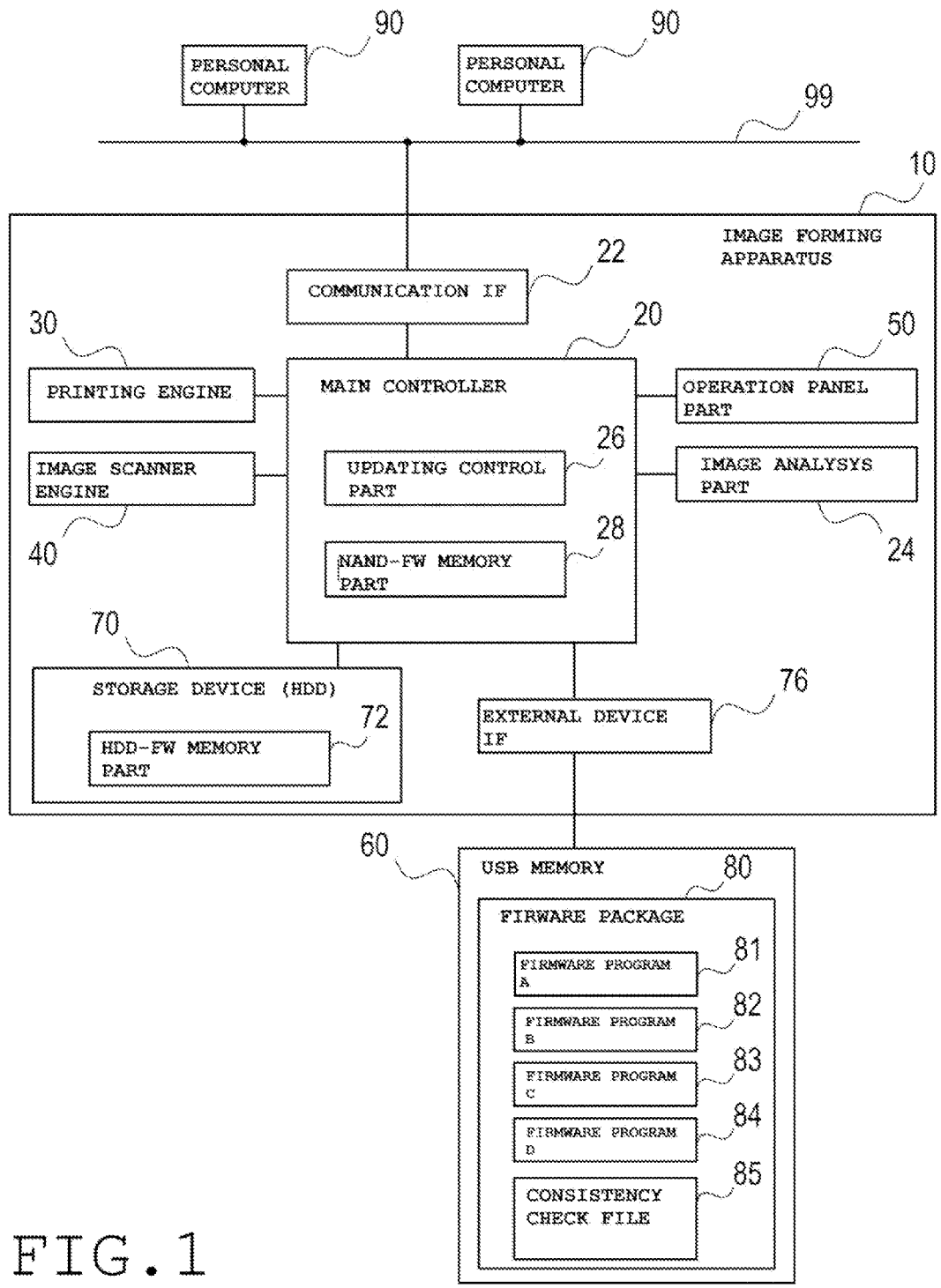
FIG. 1 is a functional block diagram of an image forming apparatus according to an embodiment of the present disclosure.

FIG. 1 is a functional block diagram that illustrates a schematic configuration of an image forming apparatus 10 according to the present embodiment. FIG. 1 focuses mainly on a firmware updating processing for illustration purpose.

The image forming apparatus 10 takes a form of, for example, a printer or a multifunction periphery. The image forming apparatus 10 includes a main controller 20, an image analysis part 24, a printing engine 30, an image scanner engine 40, an operation panel part 50, a storage device 70, a communication interface 22, and an external device interface 76.

The main controller 20 is made up of, for example, a CPU and a non-temporary recording medium. The main controller 20 comprehensively controls each element of the image forming apparatus 10. In addition, the main controller 20 includes an updating control part 26 and a NAND-FW memory part 28. The updating control part 26 executes an update control of updating a firmware program. The NAND-FW memory part 28 stores the firmware program in an updatable manner.

The NAND-FW memory part 28 is in the form of an NAND type flash memory. It is to be noted that the firmware program is stored in an updatable manner, if necessary, in the NAND-FW memory part 28 and an HDD-FW memory part 72 of a storage device 70 that will be detailed later. Thus, sometimes, the firmware program may be stored only in the NAND-FW memory part 28. In addition, as for updating the firmware program, the firmware program stored in the NAND-FW memory part 28 and the firmware program stored in the HDD-FW memory part 72 may be updated concurrently or individually.

The communication interface 22 is an interface based on a specific telecommunications standard. The communication interface 22 is connected with PC (personal computer) 90 via network a 99. The external device interface 76 is an interface that is used to connect to an external auxiliary storage device that includes, for example, an USB memory 60 and a memory card. Here, as an example, the external device interface 76 is connected to the USB memory 60.

The USB memory 60 contains a firmware package 80 as a file to be used for updating of firmware programs. The firmware package 80 contains, in a packaged manner, for example, a firmware program A81, a firmware program B82, a firmware program C83, a firmware program D84, and a consistency check file 85. It is to be noted that in the USB memory 60 the consistency check file 85 may be contained separately from the firmware package 80.

In the NAND-FW memory part 28, the firmware program A81 and the firmware program B81 are stored. In the HDD-FW memory part 72, the firmware program AC83 and the firmware program D84 are stored. The consistency check file 85 contains file information on what is the solely updatable file and what is the file that has to be installed in combination with another file, regarding the packaged firmware program A81, firmware program B82, firmware program C83, and firmware program D84.

The image analysis part 24 creates an image data set based on a printing data set acquired from the PC 90 via the main controller 20. In addition, the image analysis part 24 analyzes an image content of each the created page and determines a fixing temperature in the printing engine 30.

The printing engine 30 includes, for example, an engine control part, an image forming part, a fixing control part, and a fixing assembly. The printing engine 30 forms a toner image on an actual paper based on the image data set generated by the image analysis part 24.

The image scanner engine 40 scans a manuscript that has been set on a specific manuscript stand (not shown) and generates an image data set of the manuscript.

The operation panel part 50 includes various operation keys and a touch panel, the various operation keys including, for example, a numeric keypad, a start key, and a power key. The operation panel part 50 accepts a user's operation instruction and notifies the same to the main controller 20. In response to the operation instruction, the main controller 20 performs a corresponding process. In addition, the operation panel part 50 displays various pieces of information.

The storage device 70 is an internal auxiliary storage device that is in the form of a hard disk drive or the like. The storage device 70 stores the image data set and/or acts as a working area for a printing process. Further, the storage device 70 includes the HDD-FW memory part 72. The HDD-FW storage part 72 is one of storage regions in which the firmware programs are stored.

Figure 2:
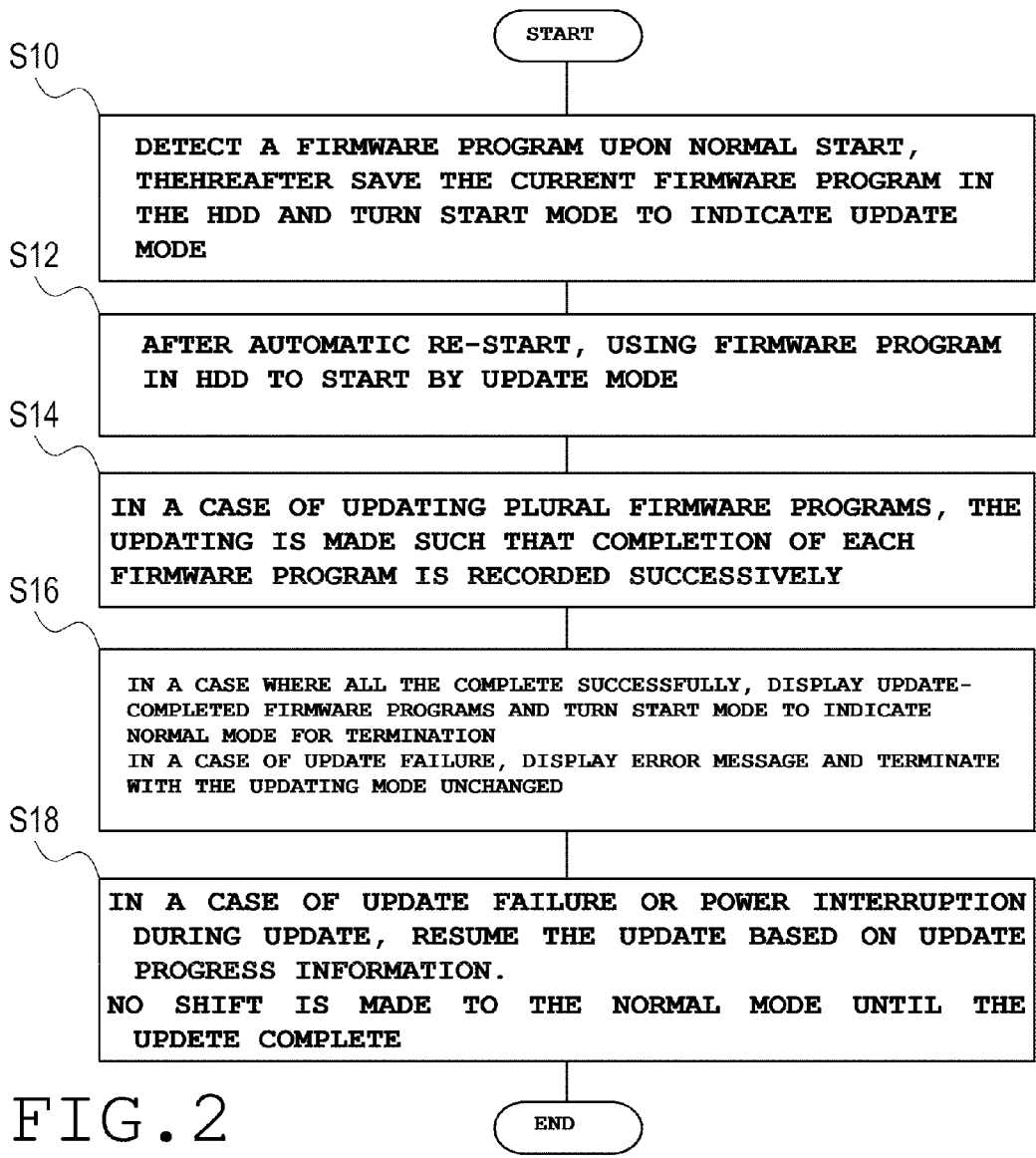
FIG. 2 is a flow chart that illustrates a normal firmware updating processing according to an embodiment of the present disclosure.
Figure 3:
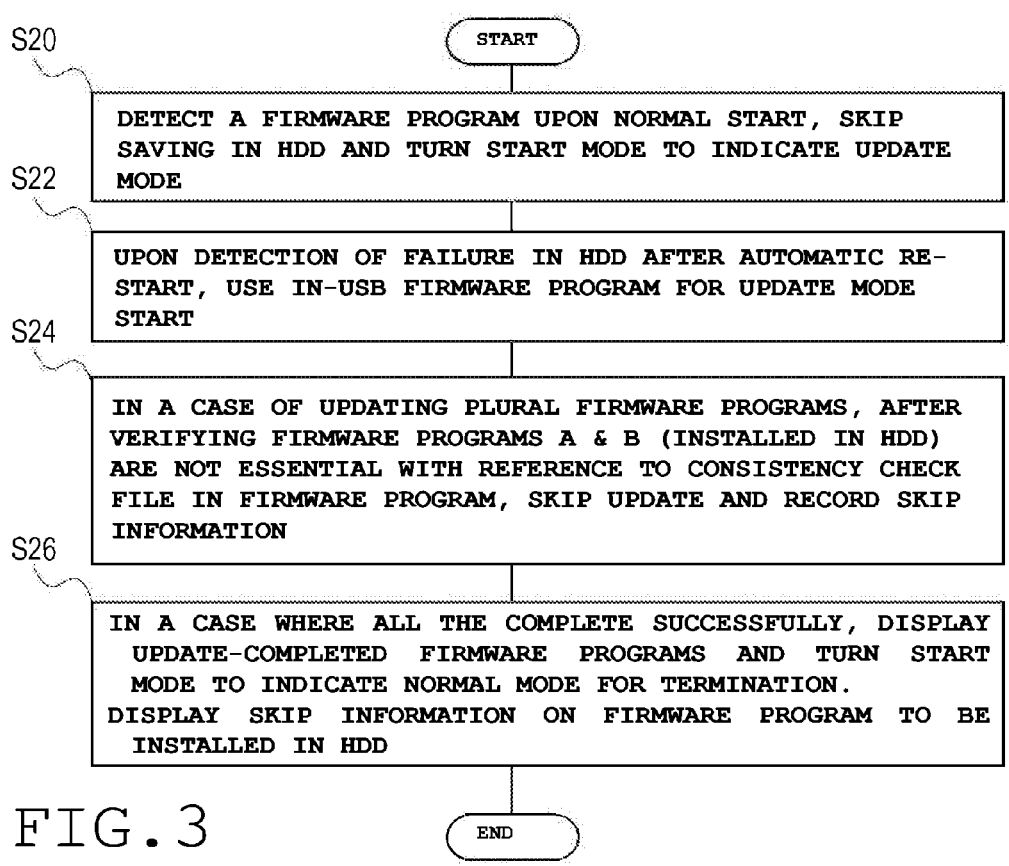
FIG. 3 is a flow chart that illustrates a normal firmware updating processing when an HDD is in failure according to an embodiment of the present disclosure.

A firmware program updating processing with the aforementioned configuration will be described. FIG. 2 is a flow chart that illustrates a usual firmware program updating processing. In addition, FIG. 3 is a flow chart that illustrates a firmware program updating sequence when the storage device 70 is in failure.

First of all, with reference to FIG. 2, the usual firmware program updating processing will be described. This processing will be applied mainly to a configuration in which a firmware program is stored and updated in the NAND-FW memory part 28.

In a case where the updating control part 26 detects, upon normal start, a firmware program that is to be updated, the updating control part 26 saves the currently loaded firmware programs into the storage device 70. Then, the updating control part 26 turns the starting mode to indicate the updating mode (S10). The firmware program to be updated is stored in the USB memory 60 so as to be ready for being accessed.

The updating control part 26, after an automatic re-start, starts the image forming apparatus 10 by the updating mode using the firmware program that is stored in the storage device 70.

In a case where a plurality of firmware programs are to be updated, the updating control part 26 updates the plural firmware programs in a successive manner such that the updating control part 26 records completion information in updating progress information whenever each the update completes (S14).

In a case where all the updates complete successfully, the updating control part 26 indicates the successfully updated firmware programs on a specific display area of the operation panel part 50. The updating control part 26 stops after turning the start mode to indicate the normal mode. In case of a failure in update, the updating control part 26 displays an error message and then stops with the updating mode unchanged.

An explanation will be made in case of a failure in update due to, for example, a power interruption. The updating control part 26 continues to execute the updating processing from the interrupted part based on the updating progress information. At this time, no shift is made to the normal mode until the update completes (S18).

Next, with reference to FIG. 3, the firmware program updating process will be described that is executed when the storage device 70 is in failure. Here, in the HDD-FW memory part 72, the firmware programs A81 and B82 are stored for being updated. In the NAND-FW memory part 28, the firmware programs C83 and D84 are stored for being updated.

In a case where the updating control part 26 detects, upon normal start, a firmware program, the updating control part 26 turns the start mode to indicate the updating mode (S20). At this time, the updating control part 26 skips the process that saves the firmware programs stored in the NAND-FW memory part 28 to the HDD-FW memory part 72.

The updating control part 26, after the automatic re-start, starts the image forming apparatus 10 by the updating mode using the firmware package 80 that is stored in the USB memory 60 (S22). That is, the firmware program C83 or the firmware program D84 both of which are to be updated in the NAND-FW memory part 28 has a function to detect that the storage device 70 is in failure. For this reason, the updating control part 26 is allowed to detect a failure of the storage device 70 prior to an execution of an updating processing. It is to be noted that the firmware program C83 or the firmware program D84 both of which are to be installed in the NAND-FW memory part 28 may include a function for recovering the storage device 70.

In a case where a plurality of firmware programs are to be updated, the updating control part 26 references to the consistency check file 85 that is contained in the firmware package 80. The updating control part 26 confirms that the firmware program A81 and the firmware program B82 that are to be installed in the HDD-FW memory part 72 are not essential for the start and thereafter skips the update. The updating control part 26 stores information on this skip in a specific file (S24). As the specific file, for example, the consistency check file 85 is available. In a case where installing the firmware program A81 and the firmware program B82 are not requisite, the firmware program C83 and the firmware program D84 are installed in the NAND-FW memory part 28.

In a case where all the updating processes complete in a successful manner, the updating control part 26 displays the update-completed firmware programs on the indication area of the operation panel part 50. Then, the updating control part 26 turns the start mode to indicate the normal mode from the update mode and then stops updating process (S24). If an installation of a firmware program is skipped, the updating control part 26 displays such a fact as a piece of skip information on the operation panel 50. In the present embodiment, the firmware program A81 and the firmware program B82 are displayed.

It is to be noted that even in case of an unsuccessful completion of the updating firmware program due to a power interruption, the updating control part 26 copes with such a case similar to the normal updating firmware program. That is, the updating control part 26 executes the updating process from the interrupted part based on the updating progress information.

As described above, according to the present embodiment, it is possible to cope with a case wherein even though a firmware program that is one of the firmware programs in the firmware package 80 and that is to be reflected and updated on the HDD-FW memory part 72, is prevented from being updated due to a failure of the storage device 70 that is in the form of a hard disk drive (HDD). In such a case, for the next start, a minimum required consistency can be held. That is, even in a failure of the HDD, it is possible to substantially separate the firmware program to be installed in the HDD-FW memory part 72. Thereby, it is possible to avoid a drawback wherein a normal start is prevented, resulting from that failures occur continuously in update on every start. In other words, it is possible to provide a safety update to the firmware package 80 in which a plurality of firmware programs are packaged. Here, a user such as a service person is released from being conscious of the detailed content of the firmware program and the state of the device. In particular, recent years, it is often that a plurality of firmware programs are packaged. Thus, it is impossible for the user to understand which firmware program is necessary at the scene of updating operation. Under such a circumstance, it has been impossible for a typical traditional technology to update all the firmware programs when one of the devices is in failure which are used as storage destination. However, in the present embodiment, a normal device is allowed to update a firmware program that is not interdependency of another firmware program.

More specifically, in the typical traditional technology in which a plurality of firmware programs are loaded, sometimes these programs are stored in both a flash memory and an HDD. Recent years, many image forming apparatuses, provided with advanced features, are loaded with a plurality of firmware programs per se. In addition, the size of the firmware program sometimes increases. Similar trends are seen in information processing devices other than the image forming apparatus.

As a result, because it takes a longtime for updating a firmware program and during which, for example, a power interruption occurs, sometimes the updating is ends incompletely or is interrupted. In some image forming apparatuses, a firmware program is stored in both a flash memory and an HDD. In such cases, sometimes an updating operation is performed in such a manner that a plurality of firmware programs are stored, from a USB memory or an external storage device, in both the flash memory and the HDD for being updated. The plural firmware programs are sometimes stored, as a package, in the external storage device. In the typical traditional technology, it is not impossible to separate a firmware program that is to be installed in the HDD. For this reason, in a case where the HDD is not accessible due to its malfunction or the like during update, sometimes failures occur continuously in update operation. Thereby, there is a risk that a normal start becomes unable. In brief, the typical traditional technology does not expect such circumstances, which requires another technology.

According to the present disclosure, in a case where a plurality of firmware programs are used as a packaged file, the update process is allowed to executed without having a user to be conscious of the detailed content of the firmware programs and the state of the device.

In the above, the present disclosure is set forth in term of the embodiments. These embodiments are exemplary. Thus, it is readily understood for those skilled in the art that various modifications of the combination of each element may be possible. In addition, those skilled in the art also readily understand that such modification fall within the scope of the present disclosure. The present embodiments exemplary disclose the image forming apparatus, however, may be applied to other information processing apparatuses. In brief, the present embodiments may be applied to an apparatus whose configuration stores a firmware program in an updatable manner for being updated in both a flash memory and an inner storage device such as an HDD.

What is claimed is:

1. An image forming apparatus comprising:
a flash memory storing a firmware program in an updatable manner;
an internal auxiliary storage region storing therein at least one firmware program in an updatable manner, the internal auxiliary storage region being different from the flash memory; and
an updating control part turning a start mode into an update mode for use in a firmware program updating upon detection of a firmware program to be updated after being connected with an external auxiliary storage device that stores a package file in which a plurality of firmware programs are packaged,
the updating control part starting the image forming apparatus by the update mode using a firmware program in the package file when the internal auxiliary storage region is in failure after a re-start,
the updating control part installing and updating, in a case where a firmware program that is to be installed into the flash memory is updatable even if an installation of a firmware program that is to be installed into the internal auxiliary storage region is unsuccessful, only the firmware program that is to be installed into the flash memory.

2. The image forming apparatus according to claim 1, wherein the external auxiliary storage device that stores the package file includes a consistency check file, the consistency check file containing information that is indicative of a relationship between files of firmware programs, among the packaged firmware programs, which are to be installed in combination, and
wherein the updating control part determines, with reference to the consistency check file, whether or not updating the firmware program is executed.

3. The image forming apparatus according to claim 1, wherein at least one of the firmware programs that are stored in the external auxiliary storage device and that are to be installed into the flash memory has a failure detection function to detect a failure of the internal auxiliary storage region, and
wherein the updating control part executes a process for detecting the failure of the internal auxiliary storage region, using the failure detection function, before starting an updating process of the firmware program.

4. A method of updating setting of an information processing apparatus in which a firmware program is stored, in an updatable manner, in both a flash memory and an internal auxiliary storage region that is different from the flash memory, the method comprising the steps of:

- detecting a firmware program to be updated when the information processing apparatus is connected with an external auxiliary storage device that stores a package file in which a plurality of firmware programs are recorded in a packaged manner;
- determining whether an internal auxiliary storage device is in failure after re-starting, the re-starting being made after turning a start mode to indicate an update mode for use in a firmware program updating when the firmware program that is to be updated is detected;
- starting the information processing apparatus by the update mode using a firmware program in the package file when an occurrence of the failure is determined; and
- installing and updating, in a case where a firmware program that is to be installed into the flash memory is updatable even if an installation of a firmware program that is to be installed into the internal auxiliary storage device is unsuccessful, only the firmware program that is to be installed into the flash memory.

* * * * *